Nov. 27, 1934.  H. A. DOUGLAS  1,982,502
JUNCTION BOX OR THE LIKE
Filed Aug. 29, 1932

Inventor
Harry A. Douglas
By: Langdon Moore
Atty.

Patented Nov. 27, 1934

1,982,502

UNITED STATES PATENT OFFICE 1,982,502

JUNCTION BOX OR THE LIKE

Harry A. Douglas, Bronson, Mich.

Application August 29, 1932, Serial No. 630,884

1 Claim. (Cl. 247—15)

This invention relates to junction boxes or the like more particularly for electrical conductors.

Among other objects, the invention aims to provide an improved box having means associated therewith for clamping the looms of current conducting wires thereto.

In one aspect, the invention is desirably inclusive of a receptacle and a closure therefor, and complementary clamping means on the receptacle and closure.

The invention will be understood by reference to the illustrative construction shown in the accompanying drawing, in which—

Figure 4:
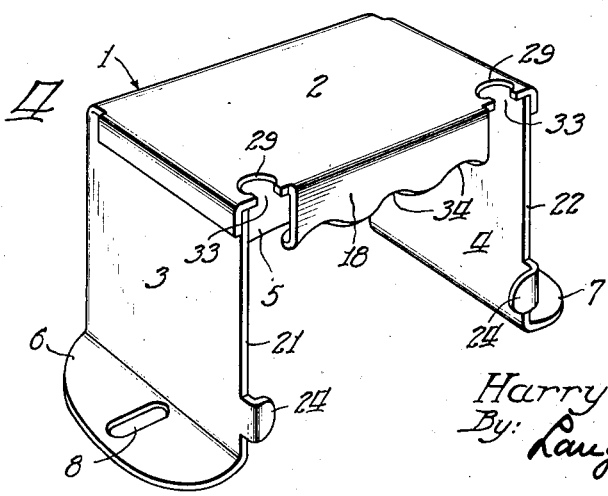
Figure 4 is a perspective view of the receptacle.

My improved box desirably includes a boxlike receptacle 1 which may be stamped from a single piece of sheet metal and formed to the shape shown in perspective in Figure 4, having right angularly related walls 2, 3, 4 and 5. The flared extensions 6 and 7 of the walls 3 and 4, respectively, may constitute attaching flanges whereby the box may be mounted on a suitable support such as a motor casing (not shown). For this purpose, the flanges 6 and 7 may be slotted as at 8 and 9.

Carried within the receptacle 1, in this instance secured upon the inner surface of the wall 5, as by the rivets 10, I have shown a block of insulating material 11 which serves as an insulating mounting for a plurality of metallic electrical connectors 12, each of which has a plurality of apertures 13 snugly receiving the conventional metallic terminals 14 of insulated current conducting wires 15.

It is frequently desired to assemble two of the wires 15 in a pair to form a cable 16 having the loom 17 thereon of any suitable insulating material and forming an insulating sleeve for the pair of wires enclosed therein. The loom 17 may be of vulcanized soft rubber, for example.

In accordance with my invention I provide one of the walls of the box with relatively movable sections for a purpose next described, the movable section forming a closure for the receptacle. In the illustrative construction the wall 2 is angularly extended to provide a fixed jaw 18 lying in the plane of another wall of the receptacle and constituting a fixed section of said other wall.

Figure 5:
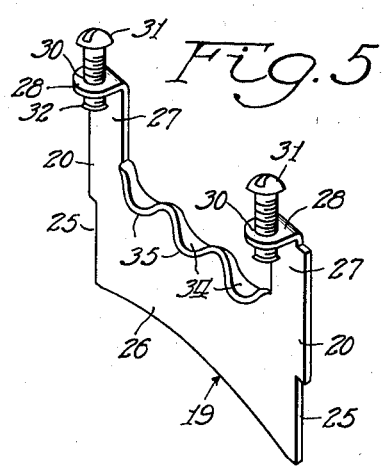
Figure 5 is the exemplary closure therefor.

Said other wall is also inclusive of a movable section 19 shown in perspective in Figure 5 and which is advantageously separable from the receptacle 1. The movable wall section 19 has bearing portions 20 which abut and slide upon the edges 21 and 22 of the walls 3 and 4, respectively. Tongues 24 are shown formed on the walls 3 and 4 to overlap the movable wall section 19 and to define its plane of movement in abutment with the edges 21 and 22. The wall section 19 may be recessed as at 25 to provide a tail 26 which by tilting of the section 19 may be inserted beneath the tongues 24 and which slides between the tongues. At its end opposite the tail 26, the movable wall section 19 is provided with side portions 27 between which the fixed jaw 18 telescopes. The movable wall section 19 is therefore movable toward and from the fixed jaw 18 in the plane thereof and thus the parts 18 and 19 constitute complementary jaws. To draw the jaws together, I have shown means here exemplified by the following construction: The side portions 27 are angularly extended to form lugs 28 which extend into the receptacle 1 to lap the wall 2. Registering holes 29 in the wall 2 and 30 in the lugs 28 receive therethrough threaded screws 31 whose shanks pass freely through the holes 29 and have threaded engagement with the holes 30. Flanges 32 at the ends of the shanks of the screws 31 may prevent them from being separated from the wall section 19 and the holes 29 may be opened to the margin of the wall 2 as at 33 so that the screw shanks may be passed laterally through these passageways when assembling the receptacle 1 and wall section 19. When thus assembled and the screws 31 turned clockwise with their heads bearing against the wall 2, the wall section 19 will be drawn toward the wall 2 to draw together the jaws formed by the wall sections 18 and 19.

Figure 1:
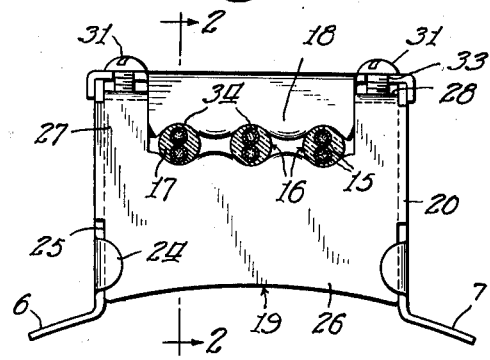
Figure 1 is an elevational view of my improved box, showing the conductors in section.
Figure 2:
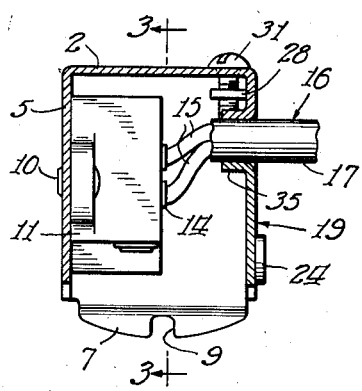
Figure 2 is a section taken on the line 2—2 of Figure 1.
Figure 3:
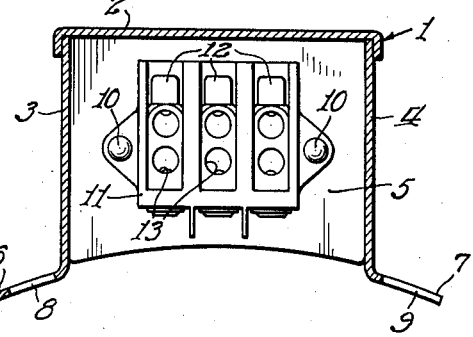
Figure 3 is a section taken on the line 3—3 of Figure 2.

Thus these jaws may have clamped therebetween the cables 16 by frictional engagement of the jaws and the looms 17 of the cables, as shown in Figures 1 and 2.

To provide for a plurality of such cables 16, the edges of the jaws are desirably formed with a plurality of complementary arcuate indentations 34 therein which space the cables apart. If desired also, the arcuately indented edges may be angularly extended as at 35 to provide somewhat semi-cylindrical complementary sleeve sections through which the cables pass.

So constructed and arranged the movable wall section 19 provides not only a closure for the receptacle 1 but also a clamping jaw by means of which the wires 15 are firmly secured to the junction box and thus the strain is relieved from the connections between the wires and the connectors 12.

Having described an embodiment of my invention, I claim:

As an article of manufacture, a junction box or the like comprising a metallic receptacle having one of its walls angularly extended to provide a fixed jaw lying in the plane of another wall of the receptacle, said fixed jaw providing a fixed section of the second wall; a movable section of the second wall forming a closure for the receptacle and slidable in the plane of the said fixed jaw thereby providing complementary jaws, said movable section having side portions between which said fixed jaw telescopes; angularly related lugs on said side portions extended into the receptacle to the first wall; registering holes in said lugs and in said first wall; clamping screws having heads bearing against the outer surface of said first wall and shanks passing through the holes, said shanks having threaded engagement with said lugs to draw the movable sections toward the first wall and the jaws together; third and fourth walls of the receptacle upon which said movable section slides; and tongues on the third and fourth walls lapping the movable section at the end of said movable section opposite the fixed jaw to define its plane of movement, openings provided in the first wall from said holes in the first wall to the margins thereof to pass the said screw shanks therethrough whereby the movable section can be separated from the receptacle without removing the screws.

HARRY A. DOUGLAS.